(12) United States Patent
Brown

(10) Patent No.: US 7,821,392 B2
(45) Date of Patent: Oct. 26, 2010

(54) MODULAR PROGRAMMABLE SAFETY DEVICE

(75) Inventor: Stephen J. Brown, Woodside, CA (US)

(73) Assignee: Health Hero Network, Inc., Palo Alto, CA (US)

( * ) Notice: Subject to any disclaimer, the term of this patent is extended or adjusted under 35 U.S.C. 154(b) by 307 days.

(21) Appl. No.: 12/117,091

(22) Filed: May 8, 2008
(Under 37 CFR 1.47)

(65) Prior Publication Data
US 2009/0278681 A1    Nov. 12, 2009

(51) Int. Cl.
*G08B 1/08* (2006.01)
(52) U.S. Cl. .............................. 340/539.22; 340/573.1; 340/692
(58) Field of Classification Search ............ 340/539.22, 340/573.1, 573.2, 691.1, 691.2, 692, 693.6, 340/384.1, 384.3
See application file for complete search history.

(56) References Cited

U.S. PATENT DOCUMENTS

| | | | |
|---|---|---|---|
| 6,847,892 B2 | 1/2005 | Zhou et al. | |
| 7,005,999 B2 * | 2/2006 | Salzhauer et al. | 340/686.1 |
| 7,118,443 B2 * | 10/2006 | Marine et al. | 446/268 |
| 2002/0128746 A1 * | 9/2002 | Boies et al. | 700/245 |
| 2004/0220707 A1 | 11/2004 | Pallister | |
| 2005/0111823 A1 | 5/2005 | Dureau | |
| 2006/0017561 A1 | 1/2006 | Albert | |
| 2006/0229810 A1 | 10/2006 | Cross et al. | |

FOREIGN PATENT DOCUMENTS
EP    0935225    8/1999

* cited by examiner

*Primary Examiner*—Toan N Pham
(74) *Attorney, Agent, or Firm*—Rahman LLC

(57) ABSTRACT

A modular programmable safety device and system coupled with multiple sensors. The device has a memory unit to store the data modules, which can be synthesized into speech and a microprocessor-based speech module, which is connected to the memory and to a transceiver. A remote server computer is connected to the programmable device through a wireless communication system and is provided with a database to store digital data modules and scripts that are either input by a user or downloaded from a third party content provider. Software is operated on the remote server computer to provide the third party contents and the scripts. The device has an external sensor port which is coupled with multiple sensors. The safety device senses a variety of safety parameters programmable with rule sets to communicate with a parent or service provider automatically.

20 Claims, 5 Drawing Sheets

MODULAR PROGRAMMABLE SAFETY DEVICE

BACKGROUND

1. Technical Field

The embodiments herein generally relate to a safety device and system, and, more specifically, to a home safety device and system for enhancing personal safety and to sense environmental variables based on user-modifiable rules.

2. Description of the Related Art

Evaluation and development of computer and electronic devices have provided new dimensions in exploring new and advanced uses of technology. These new technologies have been incorporated into an increasing number of products for various purposes. Moreover, a variety of safety devices have been developed to be used at home for safety and health monitoring purposes. Existing interactive toys and other safety devices are generally not capable of providing a safety solution that can be adapted for a wide range of situations and which can be customized by the end-user to fit individual needs. Hence, there is a need to develop a programmable, modular safety device coupled with multiple sensors, which can be used to evaluate a variety of safety parameters remotely.

SUMMARY

In view of the foregoing, the embodiments herein provide a modular programmable safety device and system. The device has a memory component to store data modules, which can be synthesized into speech and a microprocessor-based speech module, which is connected to the memory component and to a transceiver. The device has an external sensor port which is coupled with multiple sensors. The transceiver receives a query sent by the user. A remote server computer is connected to the programmable device through a wireless communication system and is provided with a database to store digital data modules and scripts that are either input by a user or downloaded from a third party content provider. Software is operated on the remote server computer to provide the third party contents and the scripts. The safety device receives the digital data modules and the scripts from the server computer through the wireless communication system and stores the received digital data modules and the scripts in the memory. The safety device senses a variety of safety parameters programmable with rule sets to communicate with a parent or service provider automatically. The device communicates with a service provider, user, or parent based on programmable rules that can be downloaded from the server and modified by the user.

Additionally, the embodiments herein provide a modular programmable interactive safety device environment comprising multiple sensors that can be used for a wide range of situations and can be customized by the end-user to fit individual needs. Moreover, a user may remotely query the device for status variables. Furthermore, the embodiments herein provide a modular programmable interactive safety device rules engine capable of generating multiple scripts. Additionally, the device can sense a variety of safety parameters programmable with rule sets to communicate with a parent/guardian, user, or service provider automatically. Also, the device may be coupled with multiple sensors which can be used to evaluate a variety of safety parameters remotely.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
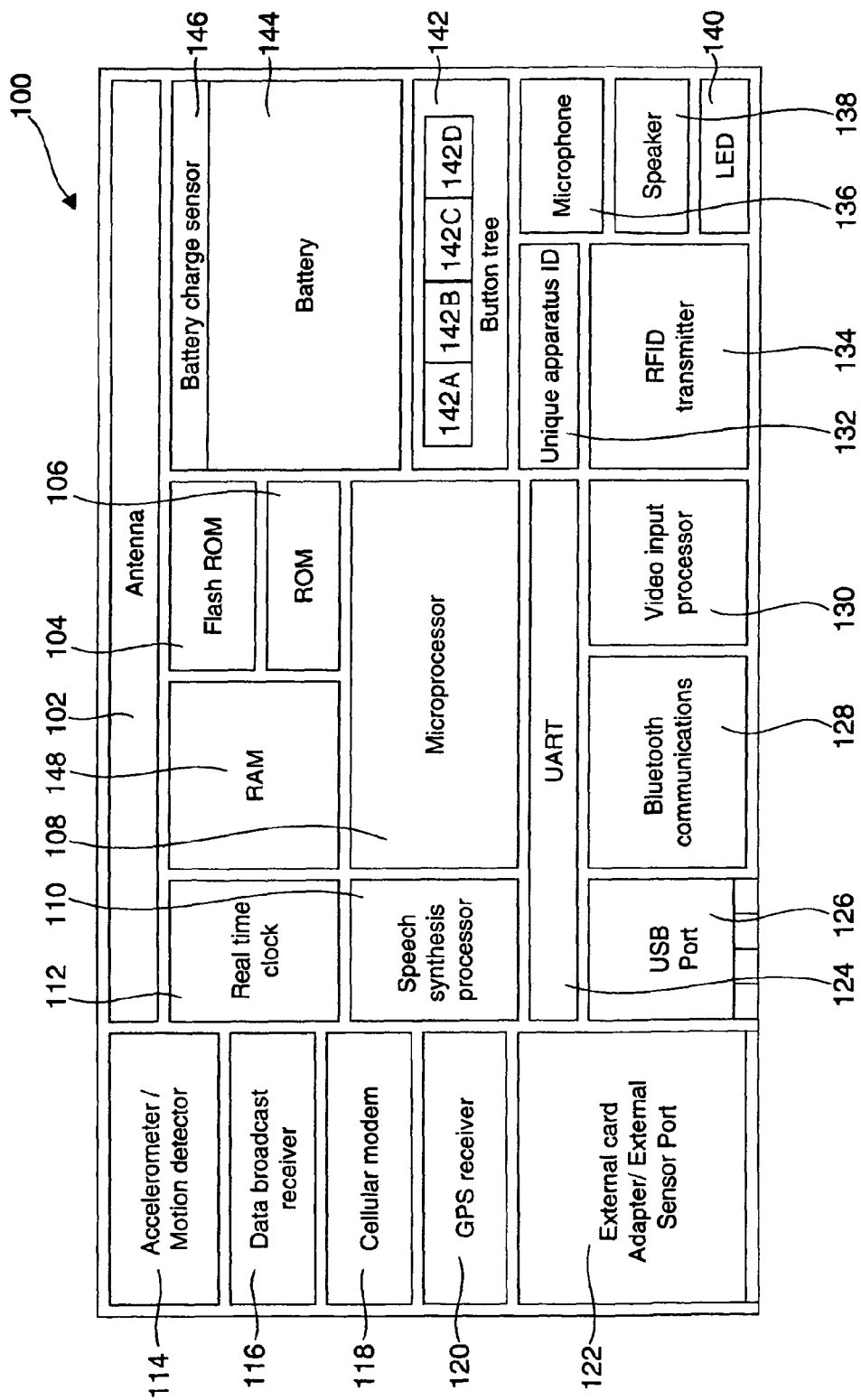
FIG. 1 illustrates a block diagram of an embedded safety device module according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned there remains a need to develop a programmable, modular safety device coupled with multiple sensors, which can be used to evaluate a variety of safety parameters remotely. The embodiments herein achieve this by providing a modular programmable safety device comprising a modular programmable safety device. The device has a memory unit and a microprocessor-based speech synthesis module that is connected to the memory and to a transceiver. The memory unit stores the data modules, which can be synthesized into speech. A remote server computer is connected to the programmable device through a wireless communication system and is provided with a database to store digital data modules and scripts that are either input by a user or downloaded from a third party content provider. Software is operated on the remote server computer to provide the third party contents and the scripts. The device has an external sensor port which is coupled with multiple sensors. A safety device senses a variety of safety parameters programmable with rule sets to communicate with a parent or service provider automatically. The transceiver receives a query sent by the user. The device communicates with a service provider, user, or parents based on programmable rules that can be downloaded from the server and modified by the user.

In emergency situations the safety device sends a message or alert to a remote server, remote service provider, or to the mobile phone of the user. The safety device can communicate in the form of Short Message Service (SMS) messages, voice messages, or can store the status of the device for later query. Referring now to the drawings and more particularly to FIGS. 1 through 5 where similar reference characters denote corresponding features consistently throughout the figures, there are shown preferred embodiments.

FIG. 1 illustrates a block diagram of the components comprised in an embedded safety device (module) 100 according to an embodiment herein. The device module 100 may be embedded in a child's toy (not shown) according to an embodiment herein. The module 100 has a microprocessor 108 operatively connected to a speech synthesis processor 110 and to memory units such as read-only memory (ROM) 106, Flash ROM 104, and random access memory (RAM) 148. The memory units store digital data modules and scripts received from a remote server computer 304 (shown in FIG. 3 and further described below) through a wireless communication system such as a Bluetooth™ communication device 128 (of FIG. 1). The Bluetooth™ communication device 128 is also used to receive a sensor signal or a radio frequency (RF) signal comprising device identification data and status data from an adjacent device. A user inputs data and activates the device module 100 through the buttons 142A-142D provided in a button tree 142. A software program or a set of instructions stored in the memory units is executed to select a script and a corresponding digital data module stored in the memory units with respect to received audio data through the microphone 136. A set of stored instructions comprising the commands are executed on the microprocessor 108 to operate a speech synthesizer processor 110 to synthesize the selected digital data modules from the stored digital data modules in the memory units to generate audio data which is output through a speaker 138.

Safety device module 100 has a universal serial bus (USB) port 126 through which a flash memory drive (not shown) storing a digital data module and a script generated by others may be coupled. The functional components in the module 100 are supplied with electrical power provided from a battery 144. A battery charge sensor 146 detects the residual charge in the battery 144 and the detected residual battery charge condition is displayed through a light-emitting diode (LED) display 140.

Safety device module 100 has a cellular modem 118 that has a wireless adapter (not shown) that connects the safety device module 100 to a cellular mobile system (not shown) for data transfer. The cellular modem 118, which comprises its own antennas, is operatively connected to the USB port 126.

Furthermore, the safety device module 100 has an external sensor port 122 through which multiple external sensors (202-220 of FIG. 2) are coupled. Global positioning system (GPS) receiver 120 (of FIG. 1) is also provided to detect location coordinates by interpreting signals broadcast from global positioning satellites. Data broadcast receiver 116 receives application content for a data broadcast. Additionally, safety device module 100 has an accelerometer/motion detector 114 which functions as a movement sensor. The data received from the sensors (202-220 of FIG. 2) are stored along with the time data received from a real time clock 112 (of FIG. 1). A universal asynchronous receiver/transmitter (UART) 124 is provided to perform a serial communication between a microcontroller (not shown) and the peripheral units attached to the module 100. The video image data acquired from an external device such as a video camera (not shown) is input into the module 100 through a video input processor 130. The identification of a toy embedded with the module 100 is transmitted to an adjacent device through a unique identification device 132 or a radio frequency identification (RFID) transmitter 134. An antenna 102 is provided to transmit and to receive data from an external device such as a remote server 304 (of FIGS. 3 and 4) or a user device.

Figure 2:
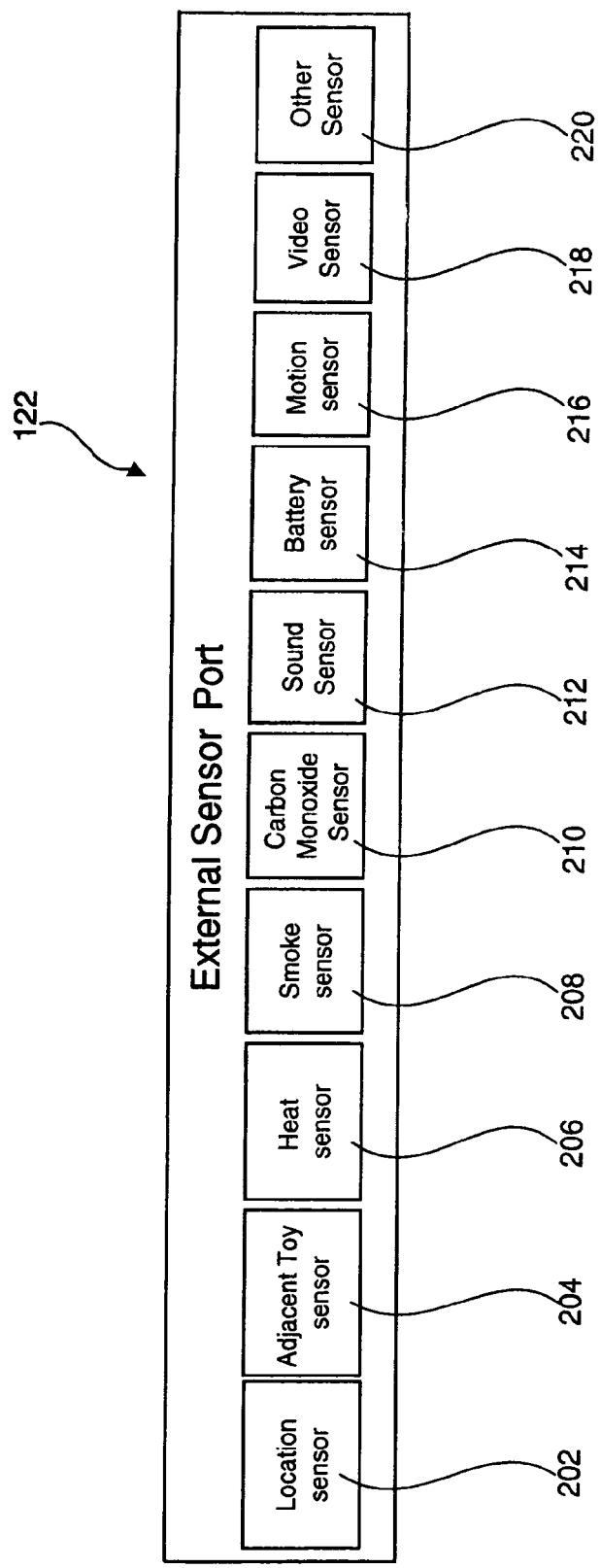
FIG. 2 illustrates different types of sensors that can be embedded in an external sensor port of the device of FIG. 1 for sensing various safety parameters according to an embodiment herein.

FIG. 2 (with respect to FIG. 1) illustrates different types of sensors 202-220 that can be coupled in the external sensor port 122 (of FIG. 1). The sensors 202-220 can be coupled to the external sensor port 122 including location sensor 202, adjacent toy sensor 204, heat sensor 206, smoke sensor 208, carbon monoxide sensor 210, sound sensor 212, battery sensor 214, motion sensor 216, video sensor 218, and other sensor 220 based on safety requirements.

The location sensor 202 detects the position of a toy embedded with a safety device module 100 (of FIG. 1) using the GPS receiver 120 (of FIG. 1). The presence of an adjacent toy is detected with the adjacent toy sensor 204. The heat sensor 206 detects a variation in the thermal condition around a safety device embedded with the module 100 (of FIG. 1) and further detects an overheating condition to sense an emergency situation. The smoke sensor 208 detects the presence of smoke or fire around the toy or safety device embedded with the module 100 (of FIG. 1). The carbon monoxide sensor 210 measures the amount of carbon monoxide present in the ambient environment around the toy or safety device module 100 (of FIG. 1). The sound sensor 212 detects, via microphone 136 (of FIG. 1) the input sound from the external surroundings of the toy or safety device module 100 (of FIG. 1). The battery sensor 214 measures the residual level of the battery 144 (of FIG. 1) provided in the module 100 (of FIG. 1) to supply power to various functional components to detect a low battery condition. A motion sensor 216 detects the movement of an adjacent device such as a toy or a vehicle. A video sensor 218 detects the input of a video image from an external device such as video camera. The other sensor 220 includes sensors such as an infrared (IR) sensor etc., which may be customized by a user to detect any specific physical parameters to identify an emergency condition in the environment around the safety device module 100 (of FIG. 1). The output of each sensor 202-220 is input into a rules engine 502 (shown in FIG. 5) provided in the safety device module 100 (of FIG. 1) to select a suitable script or message for replay.

Figure 3:
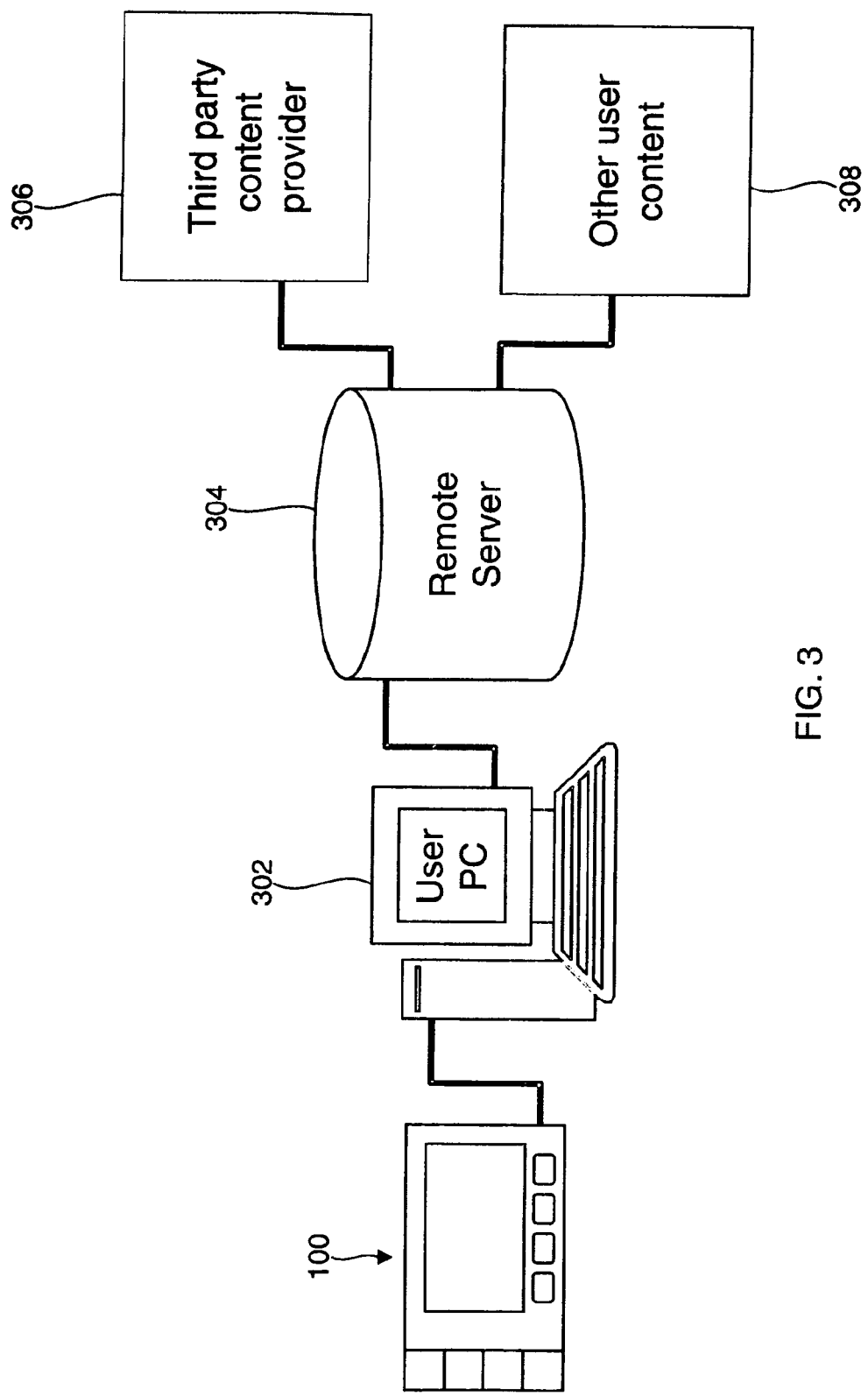
FIG. 3 illustrates a block diagram of a system for remote programming and the exchange of scripts in a modular programmable safety device connected to a remote server through a personal computer according to an embodiment herein.

FIG. 3 shows a block diagram of another embodiment herein in which a programmable interactive device module 100 is operatively connected to a remote server computer 304 through a personal computer 302. Software is operated in the remote server computer 304 to receive scripts and their respective digital data modules from a third party content provider 306 or the contents generated by other users 308. The received content and the scripts are stored in a database (not shown) at the remote server 304.

Figure 4:
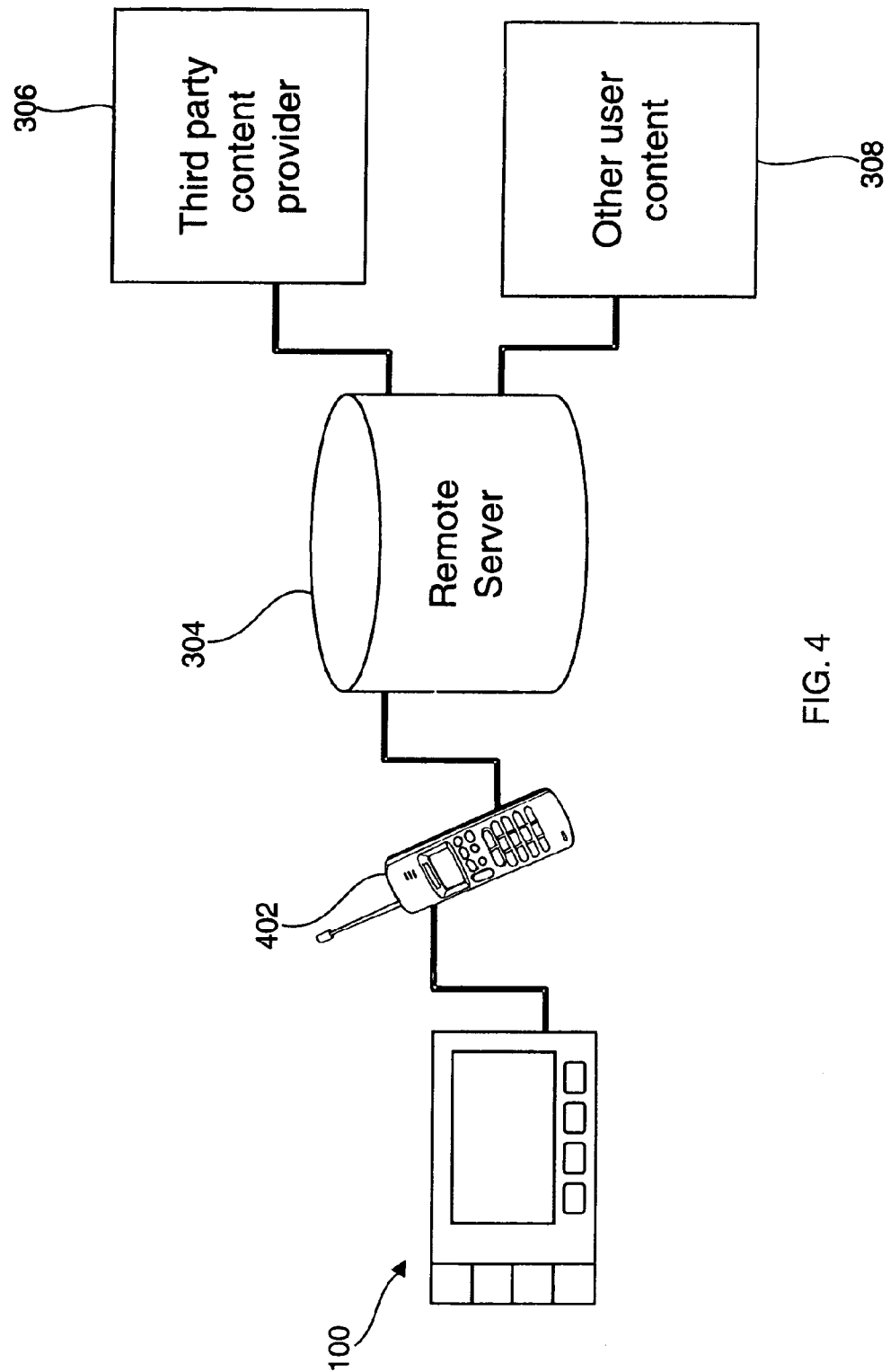
FIG. 4 illustrates a block diagram of a system for remote programming and the exchange of scripts in the modular programmable safety device connected to a remote server through a mobile telephone according to an embodiment herein.

FIG. 4 shows a block diagram of another embodiment herein in which a programmable interactive device module 100 is connected to a remote server computer 304 through a mobile telephone 402 to receive the script and digital data modules from a third party content provider or scripts and digital data modules generated by other users 308. A pager or any other personal communication device can be used in the place of mobile telephone 304 to communicatively couple the interactive programmable device module 100 to the remote server computer 304.

Figure 5:
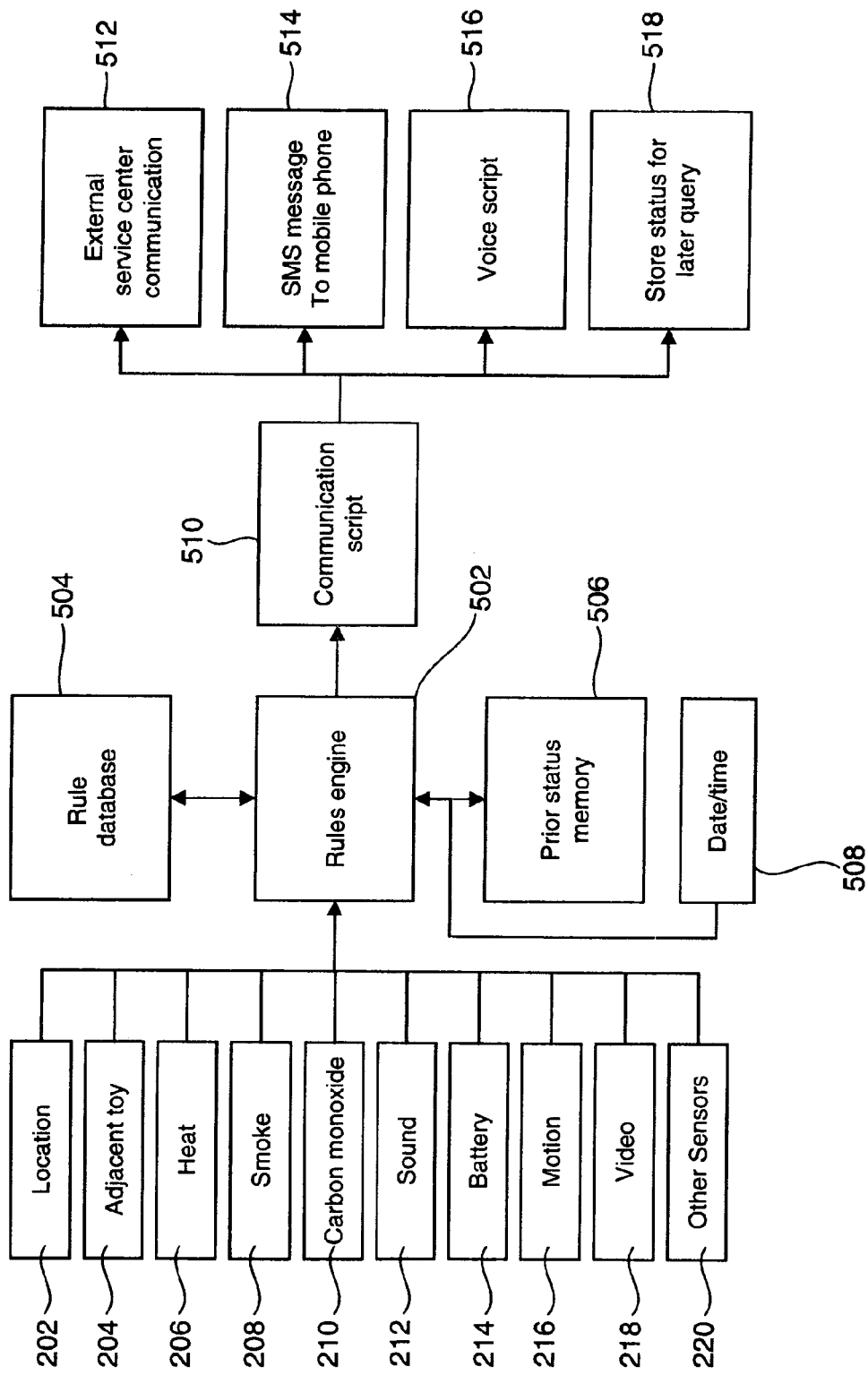
FIG. 5 illustrates a flowchart illustrating a rule engine process flow according to an embodiment herein.

FIG. 5 illustrates a rules engine process according to the embodiments herein. A user remotely sends a query to the device module 100 (of FIG. 1) for the status variables detected by the device module 100. The status variables denotes the variation in physical parameters such as the heat, sound, and carbon monoxide level in the ambient environment around the safety device module 100 (of FIG. 1) or the variation in the position or the condition of a toy embedded with the safety device module 100. The external sensors 202-220 operate through a rules engine module 502, which is operatively connected to a rule database 504. Using the rules engine module 502 and rule database 504, rule sets are generated for emergency situations including fire, carbon monoxide, overheating, and health parameters. Rules engine module 502 is also operatively connected to a communication script module 510.

Communication script module 510 sends communication messages to the remote server 304 (of FIGS. 3 and 4), remote service provider 306 (of FIGS. 3 and 4), or to the mobile phone 402 (of FIG. 4) of the user. Communication script module 510 is also adapted to send SMS messages 514 or voice messages 516 to the mobile phone 402 (of FIG. 4), or can store a variation in the condition around a safety device module 100 (of FIG. 1) based on the output of the sensors 202-220 for the later query 518 by a user. In another embodiment, the communication script module 510 can also send a message to an external service center 512. The output of the sensors 202-220 are stored in the prior status memory 506 along with the time/date data 508. With respect to FIGS. 1 through 5, rules engine module 502 is capable of generating multiple scripts. Some examples are described below:

A toy response script is generated by the rules engine module 502, when an adjacent toy is activated and detected by a sensors 202-220. The toy is activated to output a response based on rules that include adjacent toy type, initiation text, and response rules, when the adjacent toy is detected to be a talking toy. The generated toy response script is fed to a voice generator and the generated voice is output through the speaker 138 (of FIG. 1). The generated data are stored in the memory units (of FIG. 1) in a response mode.

An education script is generated by the rules engine module 502, when an adjacent toy is detected by the adjacent toy sensor 204 and the sound emitted by the adjacent toy is detected by the sound sensor 212 so that the toy responds to an adjacent toy based on the generated educational script that can be health and behavior related, learning a language, or any other topic, for example.

A baby left in a car script is produced by a rules engine module 502 using the rules database 504 based on the output of a location sensor 202 which detects a baby in a car and the output of a movement sensor 216, when the presence of the toy in a car along with a baby is detected by the location sensor 216 based on GPS rules and movement. The generated baby left in the car script is output to an emergency call and central server. The toy senses the increase in the ambient heat based on the output of a heat sensor 206 and the extended crying action of a baby from the output of a sound sensor 212 to activate an emergency call. A cellular modem 118 (of FIG. 1) is operated to forward the generated baby left in the car script, an emergency call, and an alarm to a server 304 (of FIGS. 3 and 4).

The rules engine module 502 produces a carbon monoxide script based on the data stored in a rules database 504 and the output of a carbon monoxide sensor 210 which detects the increase in the carbon monoxide level in an enclosed environment after the identification of the toy being located at the home based on the GPS rules. The generated carbon monoxide script is forwarded by a cellular modem 118 (of FIG. 1) to a service center or a remote server 304 (of FIGS. 3 and 4). An alarm is also output to the service center and server 304 based on the output trend of the carbon monoxide sensor 210.

The rules engine module 502 generates a fire script using the data stored in a rules database 504, when the toy is identified as being at the home of the user by a location sensor 202 based on GPS rules and a smoke detector 208 senses smoke. A fire alarm is activated and forwarded to a service center/remote server 304 (of FIGS. 3 and 4). A script such as "I smell smoke," is output to a voice generator to produce an audible fire alarm. The alarm is forwarded to the server 304 through a cellular modem 118 (of FIG. 1).

A sudden infant death syndrome (SIDS) script is generated by a rules engine module 502 using a rules database 504 based on the outputs of location sensor 202 and breathing sound sensor 212, when the toy is identified as being in bed with a baby by a location sensor 202 based on GPS rules and when the breathing pattern is identified by a breathing sound sensor 212, and breathing patterns. An alarm is generated based on the detected variations in a breathing pattern. The alarm is output to a service center or remote sever 304 (of FIGS. 3 and 4) through a cellular modem 118 (of FIG. 1) to activate an emergency call. The alarm and emergency call are forwarded along with the generated script to the server 304. A breathing pattern change activates an alarm and emergency call.

The rules engine module 502 produces a kidnapping script using the data stored in a rules database 504 based on the output of a location sensor 202 and motion sensor 216, when the toy is identified as being with a baby by a location sensor 202 based on GPS rules. The toy is identified as being with a baby based on the GPS rules but not on normal geographic pattern. The generated script is forwarded to a service center or server 304 (of FIGS. 3 and 4) through a cellular modem 118 (of FIG. 1) to raise an alarm. The alarm, the detected data, and the generated kidnapping script are forwarded to the server 304 (of FIGS. 3 and 4).

A babysitter script is produced by the rules engine module 502 using the data stored in a rules database 504, when the toy records babysitter activity (using user specified sensor 220) and alerts a parent based on specified parameters. The generated baby sitter script is forwarded to a service center or server 304 (of FIGS. 3 and 4) through a cellular modem 118 (of FIG. 1) to output a call to a parent to relay the babysitter activity.

The rules engine module 502 produces a low battery script based on the data stored in a rules database 504, and the output of a battery sensor 214 when the detected residual level of the battery 144 (of FIG. 1) by the battery sensor 214 is low. The generated low battery script is output to a voice generator to produce an alarm. The generated alarm is output through a 138 speaker (of FIG. 1) and the generated low battery script is displayed through a display device (not shown) to indicate a low battery level to a user. Thus, the toy activates an alarm based on the output of the low battery sensor 314.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A modular programmable safety device comprising:
   at least one sensor adapted to sense a plurality of environmental parameters;

a memory unit adapted to store programmable data associated with environmental parameters;
a wireless communication system adapted to communicate wireless signals comprising computer-executable instructions related to the sensed plurality of environmental parameters;
a microprocessor adapted to (i) compare said sensed plurality of environmental parameters with said programmable data and said computer-executable instructions, (ii) generate processed data based on the comparisons, and (iii) convert said processed data into audio signals;
a speech synthesizer processor operatively connected to said microprocessor; and
a speaker adapted to transmit said audio signals,
wherein said audio signals comprise speech synthesized by said speech synthesizer from a communication script.

2. The device of claim 1, wherein said at least one environmental parameters comprises heat, smoke, air quality, humidity, mechanical vibrations, movement, and location.

3. The device of claim 1, wherein said at least one sensor comprises any of a location sensor, a motion sensor, an electrical power detection sensor, a clock, a date sensor, a video sensor, a carbon monoxide sensor, a smoke sensor, a heat sensor, an audio sensor, a sensor adapted to sense a proximity of objects, and a sensor adapted to be programmed for a user-specified use.

4. The device of claim 1, wherein said at least one sensor, said memory unit, said wireless communication system, said microprocessor, and said speaker are connected to a toy.

5. The device of claim 1, wherein said computer-executable instructions are adapted to be accessed from a monitor remotely located from said memory unit.

6. The device of claim 1, wherein said programmable data is adapted to be programmed from a server computer remotely located from said memory unit.

7. A monitoring system comprising:
a server computer adapted to generate programmable data associated with environmental parameters;
a modular programmable safety device in wireless communication with said server computer, wherein said modular programmable safety device comprises:
at least one sensor adapted to sense a plurality of environmental parameters;
a wireless communication system adapted to (i) receive said programmable data, and (ii) communicate wireless signals comprising computer-executable instructions related to the sensed plurality of environmental parameters;
a memory unit adapted to store the received programmable data;
a microprocessor adapted to (i) compare said sensed plurality of environmental parameters with said programmable data and said computer-executable instructions, (ii) generate processed data based on the comparisons, and (iii) convert said processed data into audio signals; and
a speaker adapted to transmit said audio signals:
a rules engine module operatively connected to said modular programmable safety device, wherein output from said at least one sensor is input to said rules engine module to select a communication script; and
a communication script module operatively connected to said rules engine module and transmitting communication messages to a user in accordance with said communication script.

8. The system of claim 7, wherein said at least one environmental parameters comprises heat, smoke, air quality, humidity, mechanical vibrations, movement, and location.

9. The system of claim 7, wherein said at least one sensor comprises any of a location sensor, a motion sensor, an electrical power detection sensor, a clock, a date sensor, a video sensor, a carbon monoxide sensor, a smoke sensor, a heat sensor, an audio sensor, a sensor adapted to sense a proximity of objects, and a sensor adapted to be programmed for a user-specified use.

10. The system of claim 7, wherein said modular programmable safety device comprises a toy.

11. The system of claim 7, wherein said modular programmable safety device is connected to a toy.

12. The system of claim 7, further comprising a monitor remotely located from said modular programmable safety device, wherein monitor is adapted to access said computer-executable instructions.

13. The system of claim 12, wherein said monitor comprises any of a personal computer and mobile communication device.

14. A method of monitoring an environment, said method comprising:
generating programmable data associated with environmental parameters; and
storing said programmable data in a modular programmable safety device, wherein said modular programmable safety device:
senses a plurality of environmental parameters using at least one sensor;
communicates wireless signals comprising computer-executable instructions related to the sensed plurality of environmental parameters;
compares said sensed plurality of environmental parameters with said programmable data and said computer-executable instructions;
generates processed data based on the comparisons;
converts said processed data into audio signals; and
audibly transmits said audio signals,
wherein said processed data comprises a communication script generated from the comparisons, and
wherein said audio signals comprise speech synthesized from said communication script.

15. The method of claim 14, wherein said at least one environmental parameters comprises heat, smoke, air quality, humidity, mechanical vibrations, movement, and location.

16. The method of claim 14, wherein said at least one sensor comprises any of a location sensor, a motion sensor, an electrical power detection sensor, a clock, a date sensor, a video sensor, a carbon monoxide sensor, a smoke sensor, a heat sensor, an audio sensor, a sensor adapted to sense a proximity of objects, and a sensor adapted to be programmed for a user-specified use.

17. The method of claim 14, wherein said modular programmable safety device comprises a toy.

18. The method of claim 14, further comprising connecting said modular programmable safety device to a toy.

19. The method of claim 14, further comprising accessing said computer-executable instructions at a monitor remotely located from said modular programmable safety device.

20. The method of claim 19, wherein said monitor comprises any of a personal computer and mobile communication device.

* * * * *